United States Patent
Chang et al.

(10) Patent No.: US 8,588,507 B2
(45) Date of Patent: Nov. 19, 2013

(54) COMPUTING DEVICE AND METHOD FOR ANALYZING PROFILE TOLERANCES OF PRODUCTS

(75) Inventors: Chih-Kuang Chang, New Taipei (TW); Xin-Yuan Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 16 days.

(21) Appl. No.: 13/523,900

(22) Filed: Jun. 15, 2012

(65) Prior Publication Data
US 2013/0108143 A1    May 2, 2013

(30) Foreign Application Priority Data
Nov. 1, 2011   (CN) ............................ 2011 1 0340202

(51) Int. Cl.
*G06K 9/00*    (2006.01)
(52) U.S. Cl.
USPC .......................................................... 382/141
(58) Field of Classification Search
USPC .................... 382/141–143, 145, 151; 348/86
See application file for complete search history.

(56) References Cited

U.S. PATENT DOCUMENTS

| | | | |
|---|---|---|---|
| 5,319,385 A * | 6/1994 | Aires | 345/156 |
| 8,154,753 B2 * | 4/2012 | Polit et al. | 358/1.15 |
| 8,482,743 B2 * | 7/2013 | Segev | 356/625 |

* cited by examiner

*Primary Examiner* — Daniel Mariam
(74) *Attorney, Agent, or Firm* — Altis & Wispro Law Group, Inc.

(57) ABSTRACT

A computing device reads pixels of an image of a product along an x-direction and a y-direction of the image. In response to reading two neighboring pixels having different color values, the device regards one pixel having a predetermined color value from the two neighboring pixels as a profile point of the image, to generate one or more point-clouds consisting of all profile points of the image. Furthermore, the device reads one or more theoretical profile curves of the product from the storage device, aligns the one or more point-clouds and the one or more theoretical profile curves, and determines a minimum distance from each profile point in the one or more point-clouds to the one or more adjusted theoretical profile curves. A profile tolerance of the product is then determined according to a maximum value and a minimum value of the minimum distances.

20 Claims, 7 Drawing Sheets

COMPUTING DEVICE AND METHOD FOR ANALYZING PROFILE TOLERANCES OF PRODUCTS

BACKGROUND

1. Technical Field

Embodiments of the present disclosure relates to computer aided design (CAD) methods, and more particularly to, and particularly, to a computing device and a method for analyzing profiles of a product.

2. Description of Related Art

Profile tolerances reflect manufacture quality of products, and thus are very important parameters in product assembly. Profile tolerance is often obtained by scanning the surface of the product to acquire profile points of the product, and analyzing the profile points of the product and theoretical profile points of the product's CAD model. In such a measurement manner, coordinate data of the theoretical profile points are read from a CAD system, then a measurement system controls a scanner to acquire the profile points of the product based on the coordinate data. One problem is that, during the measurement process, switching between different systems (such as the CAD system and the measurement system) is involved, which is time-consuming and error-prone. Another problem is that, the measurement results are just data information, users cannot directly associate the data information with practical positions on the product.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or software, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
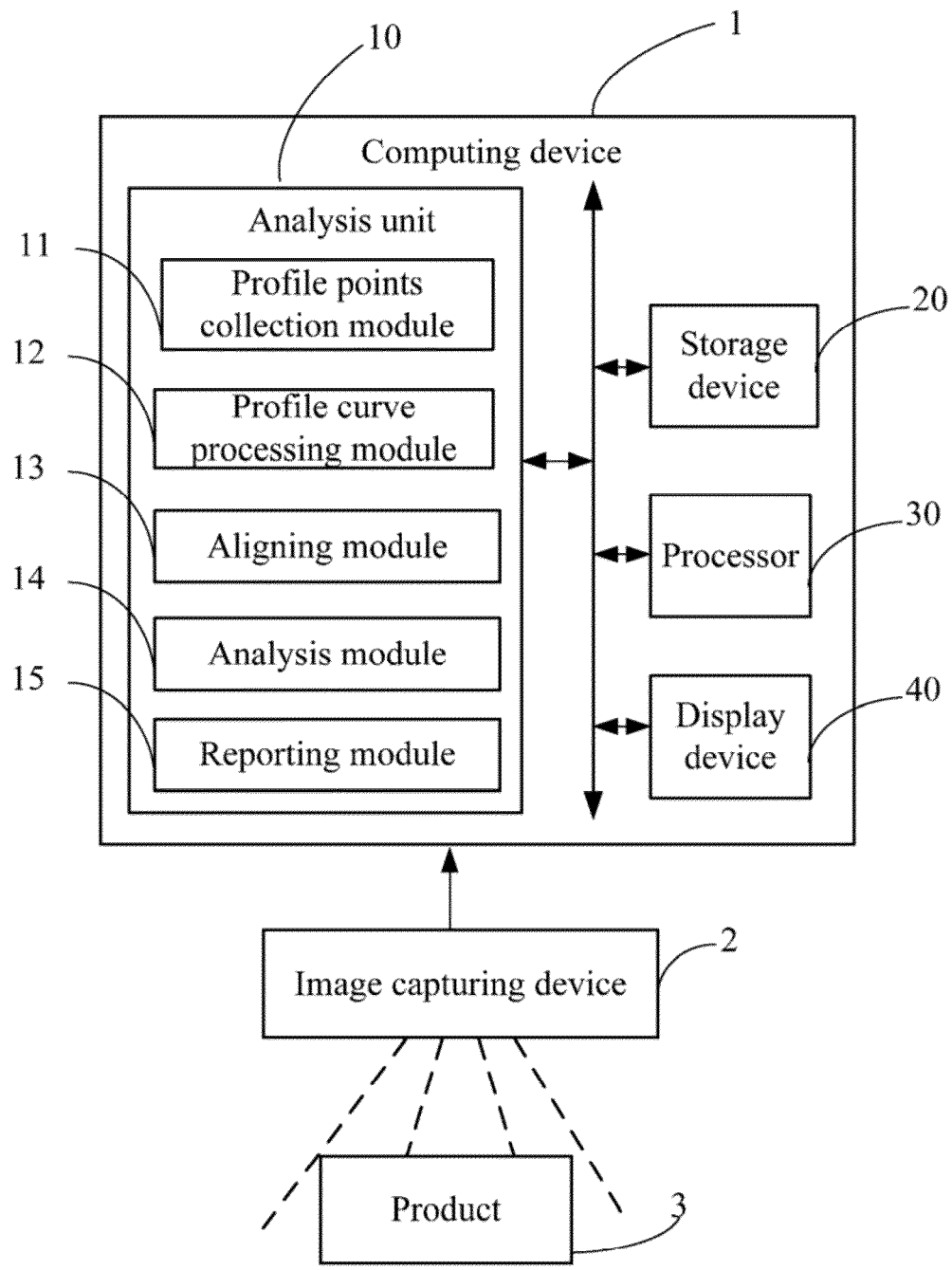
FIG. 1 is a block diagram of one embodiment of a computing device including an analysis unit for analyzing profile tolerances of products.

FIG. 1 is a block diagram of one embodiment of a computing device 1. The computing device 1 includes an analysis unit 10 that analyzes profile tolerances of products, a storage device 20, a processor 30, and a display device 40. As shown in FIG. 1, the computing device 1 is electronically connected to an image capturing device 2. The image capturing device 2 captures images a product 3, and transmits the images to the computing device 1. In this embodiment, the images are two-dimensional (2D) black-and-white images. The computing device 1 may be a computer, or any other electronic device having data processing functions.

The computing device 1 receives and stores the image into the storage device 20. The storage device 20 further stores data in relation to a model of the product 3. In this embodiment, the data in relation to the model includes one or more theoretical profile curves of the product 3, and control points of the one or more theoretical profile curves. Control points of each curve determines a shape of the curve.

The analysis unit 10 includes a profile points collection module 11, a profile curve processing module 12, an aligning module 13, an analysis module 14, and a reporting module 15. The modules 11-15 may comprise computerized code in the form of one or more programs (computer-readable program code) that are stored in the storage device 20. The computerized code includes instructions that are executed by the processor 30 to determine a profile tolerance of the product 3 by analyzing the images of the product 3 and the data in relation to the model of the product 3. Functions of the modules 11-15 are referred to description regarding FIG. 2 and FIG. 3. The storage device 20 may be a dedicated memory, such as an EPROM, a hard disk driver (HDD), or a flash memory.

Figure 2:
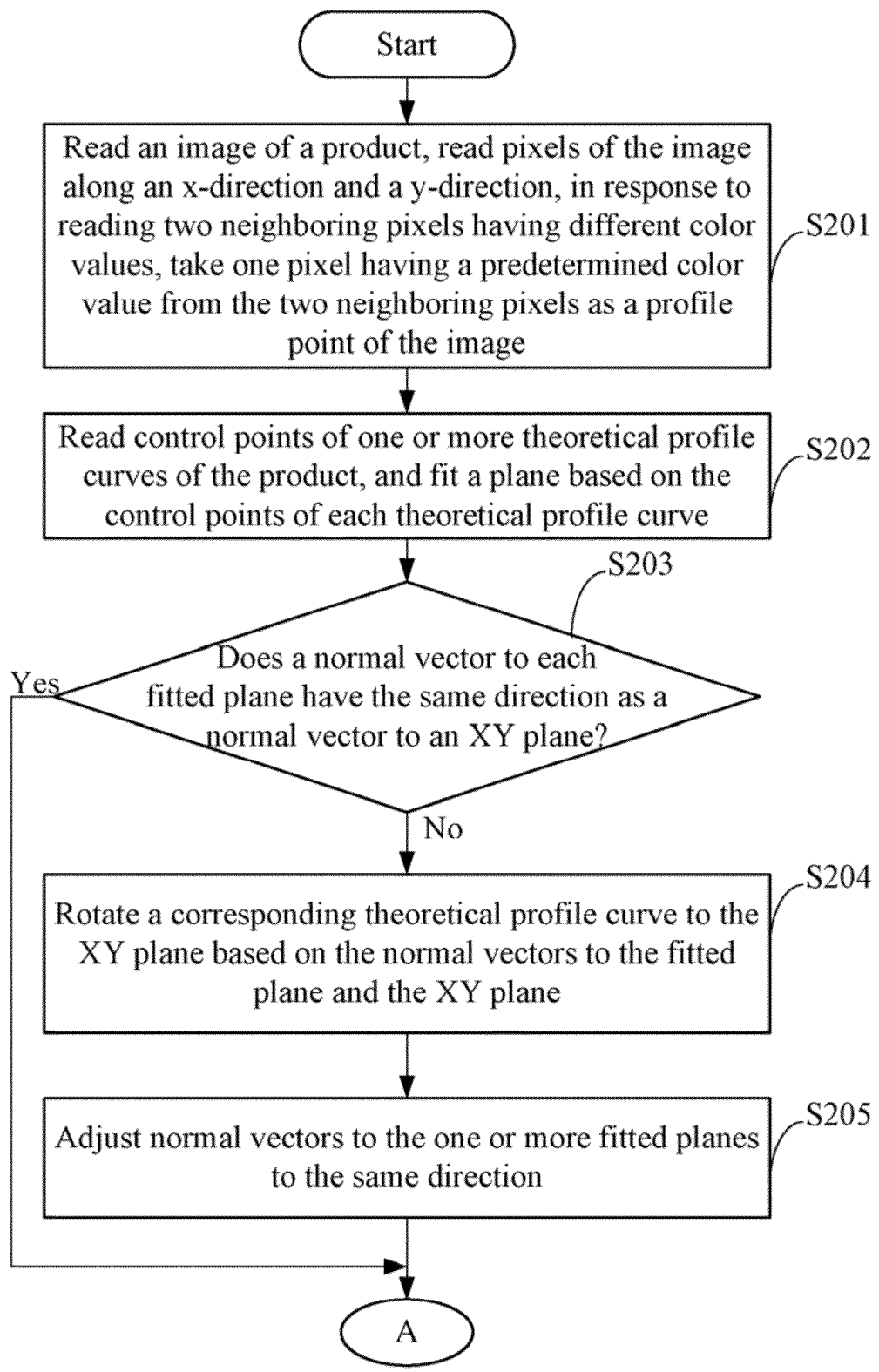
FIG. 2 and FIG. 3 are flowcharts of one embodiment of a method for analyzing profile tolerances of products.
Figure 3:
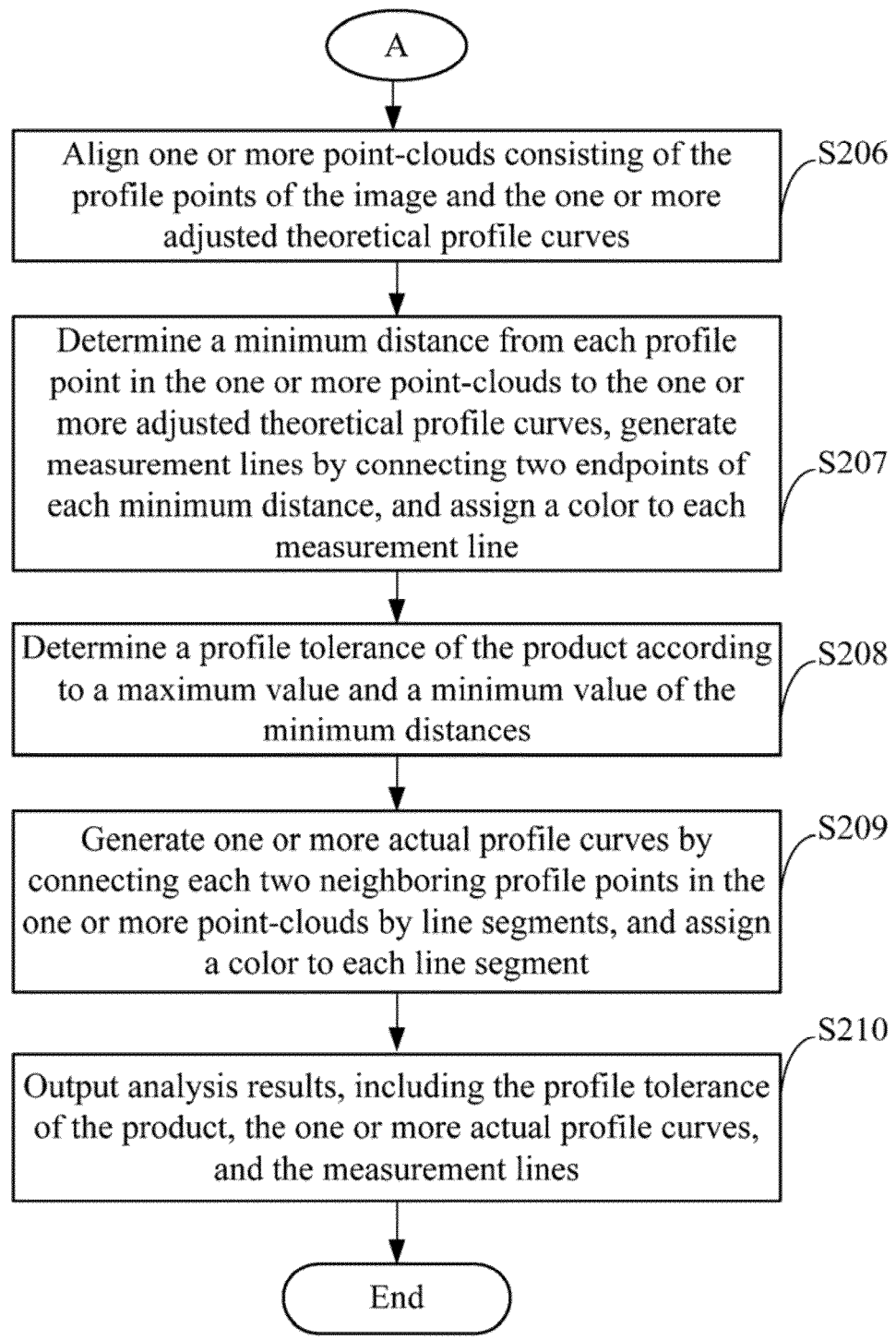

FIG. 2 and FIG. 3 are flowcharts of one embodiment of a method for analyzing profile tolerances of products. Depending on the embodiment, additional steps may be added, others removed, and the ordering of the steps may be changed.

Figure 4A:
FIG. 4A is an example of a point-cloud consisting of profile points acquired from a 2D image of a product.

In step S201, the profile points collection module 11 reads an image of the product 3 from the storage device 20, and reads pixels of the image along an x-direction and a y-direction of the image. In response to the profile points collection module 11 reading two neighboring pixels having different color values, the profile points collection module 11 takes one pixel having a predetermined color value from the two neighboring pixels as a profile point of the image. In this embodiment, the image is a two-dimensional (2D) black-and-white image consisting of pure black pixels having color values (0, 0, 0) and pure white pixels having color values (255, 255, 255). If the predetermined color value is (255, 255, 255), and the profile points collection module 11 reads five pixels p1(0, 0, 0), p2(255, 255, 255), p3(255, 255, 255), p4(255, 255, 255), p5(0, 0, 0), then the pixels p2 and p4 may be regarded as two profile points of the image. All profile points in the image form one or more point-clouds representing profile points on surface of the product 3. For example, a FIG. 4A shows a point-cloud consisting of profile points of the image.

Figure 4B:
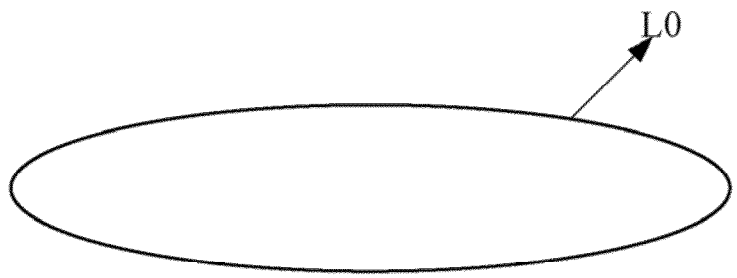
FIG. 4B is an example of a theoretical profile curve of a CAD model of the product.

In step S202, the profile curve processing module 12 reads one or more theoretical profile curves of the product 3 from the storage device 20, and fits a plane corresponding to each theoretical profile curve according to control points of the theoretical profile curve. The control points of each theoretical profile curve control a shape of the theoretical profile curve, and are stored in an array of the theoretical profile curve. For example, FIG. 4B shows a theoretical profile curve L0 corresponding to the point-cloud consisting of profile points in FIG. 4A.

In step S203, the profile curve processing module 12 determines if a normal vector to each fitted plane has the same direction as a normal vector to an XY plane. If normal vectors of all fitted planes have the same direction as the normal vector to the XY plane, step S206 is implemented. If a normal vector to any fitted plane has a different direction with the normal vector to the XY plane, step S204 is implemented.

In step S204, the profile curve processing module 12 rotates a corresponding theoretical profile curve to the XY plane based on the normal vectors to the fitted plane and the XY plane. For example, if a plane A is fitted according to the control points of the theoretical profile curve L0 shown in FIG. 4B, the normal vector to the plane A is VA ((V.x, V.y, V.z), and the normal vector to the XY plane is V1(V1.x, V1.y, V1.z), then an included angle A1 between the normal vector VA and the normal vector V1 can be determined according to the formula:

$$A1 = a\cos\left[\frac{V \cdot x * V1 \cdot x + V \cdot y * V1 \cdot y + V \cdot z * V1 \cdot z}{\sqrt{(V \cdot x^2 + V \cdot y^2 + V \cdot z^2) * (V1 \cdot x^2 + V1 \cdot y^2 + V1 \cdot z^2)}}\right]$$

A normal vector V2(V2.x, V2.y, V2.z) that is perpendicular to the normal vector VA and the normal vector V1 can be determined according to the formulas:

$V2.x = V.y*V1.z - V1.y*V.z;$ $V2.y = V.z*V1.x - V1.z*V.x;$ and $V2.z = V.x*V1.y - V1.x*V.y$ Furthermore, a rotation matrix of the theoretical profile curve L can be obtained by rotating an identity matrix around the normal vector V2 by the angle A1. For example, a three-dimensional identity matrix U1 is as follows:

$$U1 = \begin{bmatrix} 1 & 0 & 0 \\ 0 & 1 & 0 \\ 0 & 0 & 1 \end{bmatrix}$$

Then, the theoretical profile curve L can be rotated to the XY plane by multiplying the control points of the theoretical profile curve L by the rotation matrix.

In step S205, after all of the theoretical profile curves are in the XY plane, the profile curve processing module 12 adjusts normal vectors to the one or more fitted planes to the same direction. Even if all of the theoretical profile curves are in the XY plane, the normal vectors to the one or more fitted planes may point to two opposite directions. Adjusting the normal vectors to the one or more fitted planes to the same direction can be performed as follows: selecting one theoretical contour curve (such as the curve L0 in FIG. 4B), determining an included angle between a direction of a normal vector to the selected theoretical contour and a direction of a normal vector to each remaining theoretical contour curve, and if the included angle is more than 90 degrees, adjusting a direction of the normal vector of the remaining theoretical contour curve to an opposite direction by reversing a storage sequence of the control points in the array of the remaining theoretical contour curve.

Figure 5:
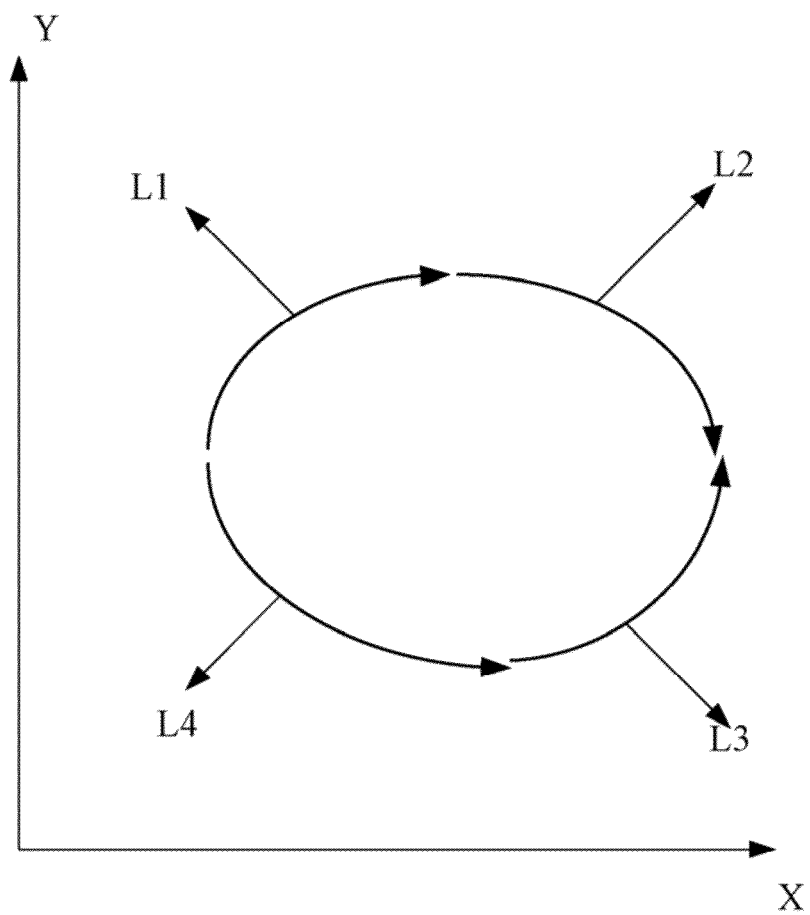
FIG. 5 is an example illustrating four curves in a XY plane.

For example, as shown in FIG. 5, there are four curves L1-L4, the curves L1 and L2 directs to a clockwise direction, while the curves L3 and L4 directs to a counterclockwise direction, so that the curves L1 and L2 should be changed to direct to the counterclockwise direction or the curves L3 and L4 should be changed to direct to the clockwise direction, to make sure normal vectors of the four curves L1-L4 point to the same direction.

Figure 6:
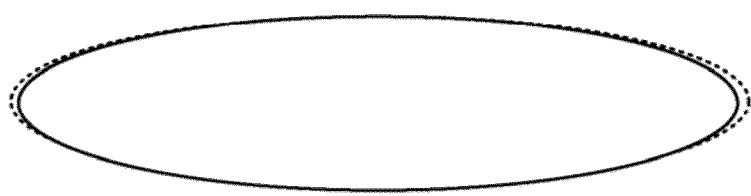
FIG. 6 is one embodiment illustrating aligning of the point-cloud in FIG. 4A and the theoretical profile curve in FIG. 4B.

In step S206, the aligning module 13 aligns the one or more point-clouds consisting of the profile points of the image and the one or more adjusted theoretical profile curves using a mathematical method. In this embodiment, the mathematical method is Newton's iteration f(X):

$$f(X) = \min\sqrt{\frac{\sum_{i=1}^{n}\left(\sqrt{(X2-X1)^2 + (Y2-Y1)^2 + (Z2-Z1)^2}^{2}\right)}{n}}$$

where (X1,Y1,Z1) represents a profile point in the one or more point-clouds, n represents a quantity of profile points in the one or more point-clouds, and (X2,Y2,Z2) represents a point, which is nearest to the profile point and located on the one or more adjusted theoretical profile curves. As shown in FIG. 6, the point-cloud in FIG. 4A and the theoretical profile curve L0 in FIG. 4B have been aligned.

Figure 7:
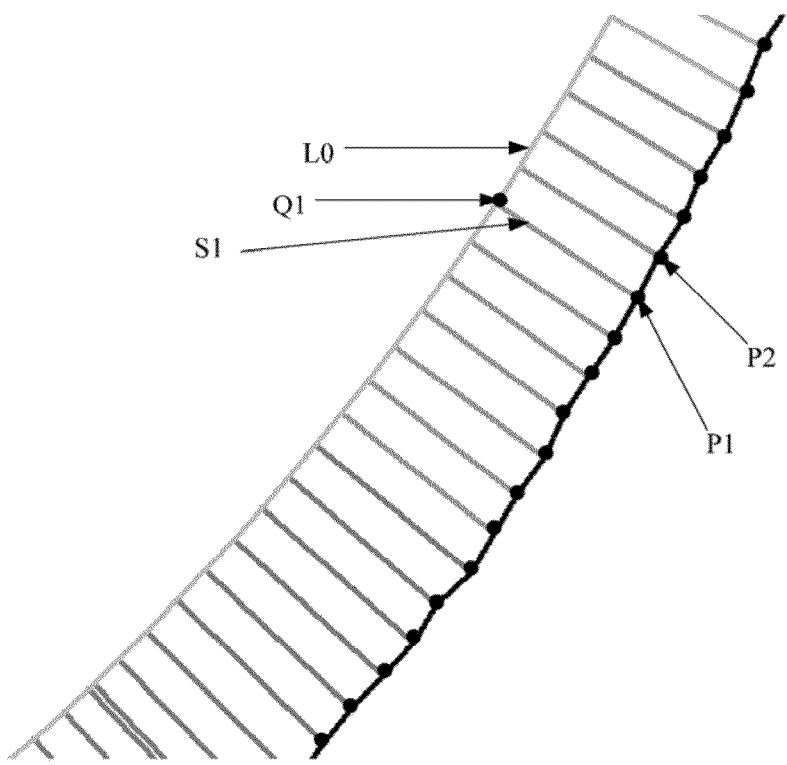
FIG. 7 is one embodiment illustrating generating measurement lines between a theoretical profile curve of a product and a point-cloud consisting of profile points acquired from a 2D image of the product, and connecting profile points in the point-cloud.

In step S207, the analysis module 14 determines a minimum distance from each profile point in the one or more point-clouds to the one or more adjusted theoretical profile curves, and generates measurement lines by connecting the two endpoints corresponding to each minimum distance. The two endpoints corresponding to each minimum distance include a profile point in the one or more point-cloud and a point on the one or more adjusted theoretical profile. The analysis module 14 further assigns a color to each measurement line according to a deviation range within which a corresponding minimum distance falls and a color assigned to the deviation range. For example, a deviation range [−2.000,−1.675] may be set to correspond to blue, a deviation range [−0.050,+0.050] may be set to correspond to green, a deviation range [+0.050,0.375] may be set to correspond to yellow, and a deviation range [+1.350,+1.675] may be set to correspond to red. As shown in FIG. 7, L0 represents an adjusted theoretical profile curve in the XY plane, a point Q1(X1',Y1',Z1') on the curve L1 is nearest to a point P1(X1,Y1,Z1) in a point-cloud, and the minimum distance between the points P1(X1,Y1,Z1) and Q1(X1',Y1',Z1') equals 0.285, which falls within the [+0.050,0.375], then a measurement line S1 generated by connecting the points P1(X1,Y1,Z1) and Q1(X1',Y1',Z1') is assigned yellow.

In step S208, the analysis module 14 determines a profile tolerance of the product 3 according to a maximum value and a minimum value of the minimum distances. For example, if the maximum value of the minimum distances is 0.80000, and the minimum value of the minimum distances is −0.00850, then the profile tolerance of the product 3 equals 0.80000−(−0.00850)=0.80850.

In step S209, the analysis module 14 generates one or more actual profile curves by connecting each two neighboring profile points in the one or more point-clouds by line segments, and assigns a color to each line segment according to deviation ranges within which two minimum distances corresponding to the two neighboring profile points fall and colors assigned to the deviation ranges. For example, as shown in FIG. 7, the two neighboring profile points P1 and P2 are connected by a line segment |P1P2|, if the profile point P1 corresponds to a minimum distance 0.035, which falls within the deviation range [+0.050,0.375] that corresponds to green, and the profile point P2 corresponds to a minimum distance 0.051, which falls within the deviation range [+0.050,0.375]

that corresponds to yellow, then the line segment |P1P2| may be assigned a green color or a yellow color, or a color between green and yellow.

In step S210, the reporting module 15 outputs analysis results on the display device 40. The analysis results include the profile tolerance of the product 3, the one or more actual profile curves, and the measurement lines.

Although certain exemplary embodiments of the present disclosure have been specifically described, the present disclosure is not to be construed as being limited thereto. Various changes or modifications may be made to the present disclosure without departing from the scope and spirit of the present disclosure.

What is claimed is:

1. A method being executed by a processor of a computing device for analyzing profile tolerances of products, the method comprising:
    (a) reading pixels of an image of a product along an x-direction and a y-direction of the image, wherein in response to reading two neighboring pixels having different color values, regarding one pixel having a predetermined color value from the two neighboring pixels as a profile point of the image, and generating one or more point-clouds consisting of all profile points of the image;
    (b) reading one or more theoretical profile curves of the product from a storage device, adjusting the one or more theoretical profile curves to an XY plane, and adjusting normal vectors of the one or more theoretical profile curves to direct to the same direction;
    (c) aligning the one or more point-clouds and the one or more adjusted theoretical profile curves;
    (d) determining a minimum distance from each profile point in the one or more point-clouds to the one or more adjusted theoretical profile curves; and
    (e) determining a profile tolerance of the product according to a maximum value and a minimum value of the minimum distances.

2. The method of claim 1, further comprising:
    generating a measurement line corresponding to each minimum distance by connecting each profile point in the one or more point-clouds and a corresponding point in the one or more adjusted theoretical profile curves; and
    assigning a color to each measurement line according to a deviation range within which a corresponding minimum distance falls and the color assigned to the deviation range.

3. The method of claim 2, further comprising:
    outputting the measurement lines with assigned colors on a display device.

4. The method of claim 1, further comprising:
    generating one or more actual profile curves by connecting each two neighboring profile points in the one or more point-clouds by line segments; and
    assigning a color to each line segment according to deviation ranges within which two corresponding minimum distances fall and colors assigned to the deviation ranges.

5. The method of claim 4, further comprising:
    outputting the one or more actual profile curves consisting of the line segments with assigned colors on a display device.

6. The method of claim 1, wherein step (b) comprises:
    fitting a plane corresponding to each theoretical profile curve according to control points of the theoretical profile curve; and
    when a normal vector to any fitted plane has a different direction with a normal vector to the XY plane, rotating a corresponding theoretical profile curve to the XY plane based on the normal vectors to the fitted plane and the XY plane.

7. The method of claim 1, further comprising:
    outputting the profile tolerance of the product on a display device.

8. A computing device, comprising:
    a storage device;
    a processor; and
    one or more programs that are stored in the storage device and executed by the processor, the one or more programs comprising instructions to perform operations:
    (a) reading pixels of an image of a product along an x-direction and a y-direction of the image, wherein in response to reading two neighboring pixels having different color values, regarding one pixel having a predetermined color value from the two neighboring pixels as a profile point of the image, and generating one or more point-clouds consisting of all profile points of the image;
    (b) reading one or more theoretical profile curves of the product from the storage device, adjusting the one or more theoretical profile curves to an XY plane, and adjusting normal vectors of the one or more theoretical profile curves to direct to the same direction;
    (c) aligning the one or more point-clouds and the one or more adjusted theoretical profile curves;
    (d) determining a minimum distance from each profile point in the one or more point-clouds to the one or more adjusted theoretical profile curves; and
    (e) determining a profile tolerance of the product according to a maximum value and a minimum value of the minimum distances.

9. The computing device of claim 8, wherein the operations further comprise:
    generating a measurement line corresponding to each minimum distance by connecting each profile point in the one or more point-clouds and a corresponding point in the one or more adjusted theoretical profile curves; and
    assigning a color to each measurement line according to a deviation range within which a corresponding minimum distance falls and the color assigned to the deviation range.

10. The computing device of claim 9, wherein the operations further comprise:
    outputting the measurement lines with assigned colors on a display device.

11. The computing device of claim 8, wherein the operations further comprise:
    generating one or more actual profile curves by connecting each two neighboring profile points in the one or more point-clouds by line segments; and
    assigning a color to each line segment according to deviation ranges within which two corresponding minimum distances fall and colors assigned to the deviation ranges.

12. The computing device of claim 11, wherein the operations further comprise:
    outputting the one or more actual profile curves consisting of the line segments with assigned colors on a display device.

13. The computing device of claim 8, wherein step (b) comprises:

fitting a plane corresponding to each theoretical profile curve according to control points of the theoretical profile curve; and when a normal vector to any fitted plane has a different direction with a normal vector to the XY plane, rotating a corresponding theoretical profile curve to the XY plane based on the normal vectors to the fitted plane and the XY plane.

14. The computing device of claim 8, wherein the operations further comprise:

outputting the profile tolerance of the product on a display device.

15. A non-transitory storage medium storing a set of instructions, the set of instructions capable of being executed by a processor of a computing device for analyzing profile tolerances of products, the method comprising:

(a) reading pixels of an image of a product along an x-direction and a y-direction of the image, wherein in response to reading two neighboring pixels having different color values, regarding one pixel having a predetermined color value from the two neighboring pixels as a profile point of the image, and generating one or more point-clouds consisting of all profile points of the image;

(b) reading one or more theoretical profile curves of the product from the storage medium, adjusting the one or more theoretical profile curves to an XY plane, and adjusting normal vectors of the one or more theoretical profile curves to direct to the same direction;

(c) aligning the one or more point-clouds and the one or more adjusted theoretical profile curves;

(d) determining a minimum distance from each profile point in the one or more point-clouds to the one or more adjusted theoretical profile curves; and (e) determining a profile tolerance of the product according to a maximum value and a minimum value of the minimum distances.

16. The medium of claim 15, wherein the method further comprises:

generating a measurement line corresponding to each minimum distance by connecting each profile point in the one or more point-clouds and a corresponding point in the one or more adjusted theoretical profile curves; and assigning a color to each measurement line according to a deviation range within which a corresponding minimum distance falls and the color assigned to the deviation range.

17. The medium of claim 16, further comprising:

outputting the measurement lines with assigned colors on a display device.

18. The medium of claim 15, wherein the method further comprises:

generating one or more actual profile curves by connecting each two neighboring profile points in the one or more point-clouds by line segments; and assigning a color to each line segment according to deviation ranges within which two corresponding minimum distances fall and colors assigned to the deviation ranges.

19. The medium of claim 15, wherein step (b) comprises:

fitting a plane corresponding to each theoretical profile curve according to control points of the theoretical profile curve; and when a normal vector to any fitted plane has a different direction with a normal vector to the XY plane, rotating a corresponding theoretical profile curve to the XY plane based on the normal vectors to the fitted plane and the XY plane.

20. The medium of claim 15, wherein the method further comprises:

outputting the profile tolerance of the product on a display device.

* * * * *